Fig. 1

Oct. 4, 1938.   A. WINKLER ET AL   2,132,227
PROCESS AND APPARATUS FOR THE MANUFACTURE OF
ENVELOPES, BAGS, AND OTHER LIKE ARTICLES
Filed Sept. 14, 1937   5 Sheets-Sheet 5

Patented Oct. 4, 1938

2,132,227

UNITED STATES PATENT OFFICE 2,132,227

PROCESS AND APPARATUS FOR THE MANUFACTURE OF ENVELOPES, BAGS, AND OTHER LIKE ARTICLES

Alfred Winkler and Max Dünnebier, Neuwied, Germany

Application September 14, 1937, Serial No. 163,754
In Germany June 2, 1937

17 Claims. (Cl. 93—62)

This invention relates to a process and apparatus whereby shaped blanks for the manufacture of envelopes, bags and other like articles have printing applied thereto and have adhesive applied to their closure flaps.

In the manufacture of envelopes, bags, and like articles having an inner or outer, or both an inner and an outer, imprint and having a gum applied to the closing flap, it has heretofore been usual to perform two special working operations, one for the application of the imprints and the other for producing the closing flap gumming, because both the printing and the gum coating on the closure flap necessitated drying operations before the shaped blanks could be treated further.

The folding and the pasting of the articles has heretofore been effected in a continuous operation with the applying and the drying of the closure flap gumming, but the drying of the imprints and the drying of the closure flap gumming have not heretofore been performed in a single uninterrupted manufacturing operation, since the arrangement of the two drying tracks necessary therefor in one and the same machine was not considered possible in actual practice, mainly because, for the drying of the imprints, a complete exposure of the individual blanks was considered necessary.

One object of this invention is to provide a process whereby shaped blanks for the manufacture of envelopes, bags and like articles are provided in a single continuous operation with an inner or outer, or both an inner and outer, imprint and with closure flap gumming.

Another object is to provide a process whereby shaped blanks are either taken from a stack or separated or detached from a paper band and are first provided with the imprints, then gummed at the closure flap edges, and are then led, in stepped formation for the simultaneous drying of the imprints and the closure flap gumming, into a drying zone or track from the end of which they are collected or individually reach a machine which effects the folding and pasting of the articles.

Another object of the invention is to provide apparatus comprising a roller for seizing the articles by suction, or in some other way, and arranged at the end of the path traversed by the shaped blanks, and which takes over the individual shaped blanks and conveys them between slowly moving conveying belts in such a way that within these belts a layer of blanks is formed which are stepped after the fashion of roofing tiles under and back of each other.

With these and other objects in view the invention consists in the novel process of handling blanks in connection with the manufacture of envelopes, bags, and other like articles, and consists in the novel construction and arrangement of parts of the apparatus hereinafter described, illustrated in the accompanying drawings and particularly pointed out in the appended claims, it being understood that various changes in the process and in the apparatus may be made without departing from the spirit of the invention nor sacrificing any of the advantages thereof.

Referring to the drawings, the apparatus shown at Figs. 1 to 5 is designed for the handling of shaped blanks previously prepared with the proper contour for the article to be produced. A stack 1 of the shaped blanks rests on a stacking table 2, the correct position of the stack upon the table being determined by adjustable stops 3 and 4 so that, in the known manner, a roller 5 rotating in the direction of the arrow as indicated, and shown only in Fig. 1, and equipped with a small suction roller 6 turning in the opposite direction, seizes at each of its revolutions the lowermost shaped blank of the stack 1 at its upper point or edge and bends it downward over a roller 7 located along the upper edge of the stacking table 2, this roller 7 being of small diameter and rotating freely. The front end of the blank thus enters between the traction roller 5 and its first counter-roller 8 which latter is resiliently mounted. The shaped blank is thus seized positively and is pulled out from under the stack 1. The blank is engaged by curved guides 9 concentrically arranged around the traction roller 5. A second counter-roller 10 cooperates with the roller 5 and is also resiliently arranged with regard to the same. The further path of the shaped blank is indicated by a dot-and-dash line, all through the entire machine.

Figure 1:
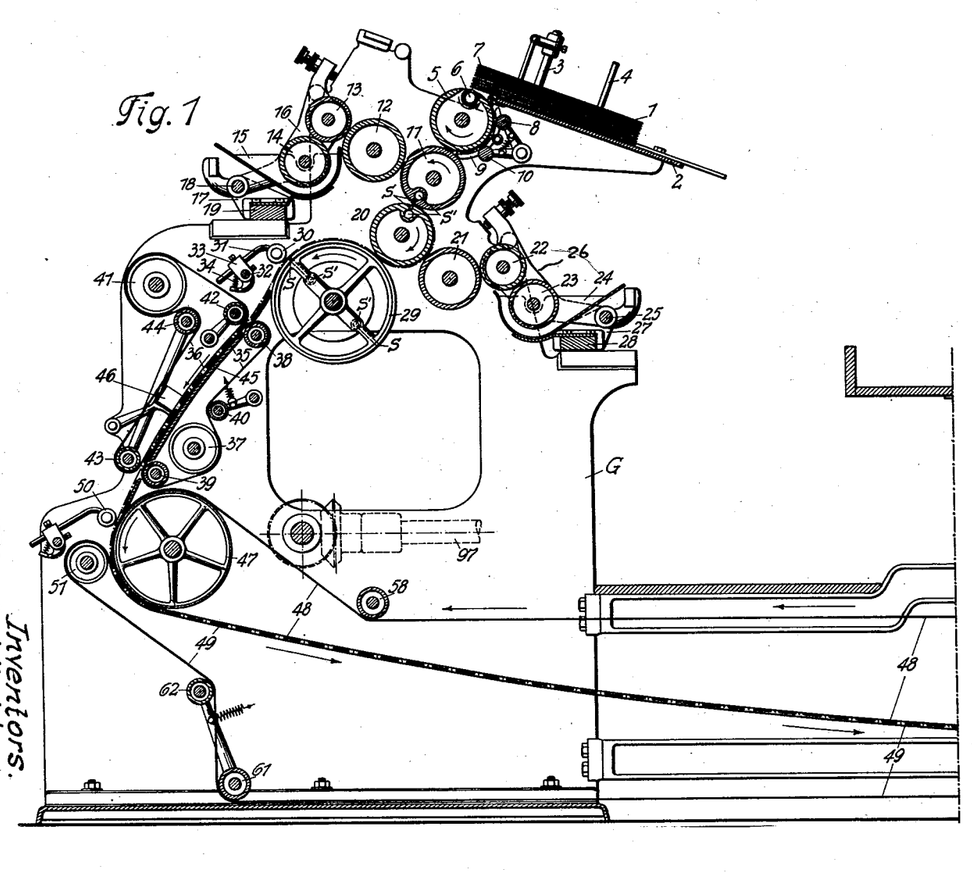
Figs. 1, 2 and 3 of the drawings show, arranged in series one beyond another according to the dot-and-dash end lines, a sectional diagram of one form of apparatus according to the invention.

The roller 5, in cooperation with its counter-rollers 8 and 10, feeds the shaped blank to a roller 11 which, in the example in the drawings, is a suction roller which seizes the shaped blank at its leading point or edge by means of its suction openings *s* which communicate with suction channel *s'* and terminate in the circumference of the roller. This roller, as well as all the other suction rollers hereinafter mentioned, is connected to a known device not shown in the drawings, for controlling the suction air. The roller 11 forms the printing cylinder of a printing mechanism in the example of the drawings and cooperates with a platen cylinder or type-carrying cylinder 12 which receives the printing ink or color from the ink trough 15 through the medium of an application roller 13 and the scooping or dipper roll 14. This application roll 13 and the dipper roll 14 are carried by a pair of levers 16 adapted to swing upon an axle 18 mounted in bearing arms 17. The ink or color trough 15 and the bearing arms 17 are carried by a cross rail 19 connecting the two side frames G of the machine. By means of the printing mechanism 11–18 above described it is possible to produce on the shaped blank an imprint which in the finished article represents an inner imprint.

Directly from the roll 11 the shaped blank is taken over by a roll 20 which is also shown as a suction roll, and is the printing cylinder of a second printing mechanism comprising a platen cylinder 21, an application roll 22, the dipper roll 23 and a color trough 24. On a pair of levers 26 adapted to swing upon an axle 25 the application roll 22 and the dipper roll 23 are mounted. The axle 25 is mounted in bearing arms 27 which together with the color trough 24 are carried on a cross rail 28 extending between the two side frames G of the machine. By means of this printing mechanism 20–27 last described an imprint can be produced on the shaped blank which on the finished article forms an outer imprint.

After the shaped blank has passed through the two printing mechanisms and has been provided selectively with inner or outer or both inner and outer imprints, it is delivered by the last printing cylinder 20 to a large roller 29. In the example shown this roller 29 engages or seizes the shaped blank by means of suction. While the roller 5 and the printing and platen cylinders 11, 12, 20 and 21 each make one complete revolution for one blank conveyance effected by them and accordingly have diameters suitable for the largest blank to be handled, the roller 29 has a diameter twice as large, so that it is capable of conveying two successive blanks to one complete revolution and for this purpose it is provided with two suction channels *s'* located diametrically opposite each other and with suction openings *s* communicating therewith and terminating in the circumference of the roller. The circumferential speed of the roller 29 is the same, however, as that of the heretofore mentioned smaller rollers.

The suction roller 29 in the first place conveys the shaped blank under its counter-rollers 30. These rollers 30 are arranged to rotate freely on cross beams 31 which are fastened and adjustable in the cross pieces 33 carried by a shaft 32. By means of a spring 34 each of the counter-rolls 30 is pressed against the circumference of the roller 29. The shaped blank emerging between the roller 29 and its counter-rolls 30 passes between two slowly running belt pairs 35, 36. The inner belts 35 are driven by the drum 37 and are led over the rollers 38 and 39 and also over an idler or tensioning roller 40. The outer belts 36 receive their drive from a drum 41 and run over rollers 42, 43 and 44. Between the rollers 38, 39 or 42, 43 the belt strands, lying directly above each other, are guided over a table 45 arched in the direction of the belt path.

The counter-rollers 30 running on the suction roll 29 are adjusted by displacing their beams 31 in the cross pieces 33 so that each shaped blank is released by said counter-rollers 30 at the moment when it is engaged or seized by the belt pairs 35, 36 between the guide rollers 38 and 42. The speed of the slowly running belt pairs 35, 36 is so arranged that the shaped blanks fed to them at a higher speed are, prior to their entering the same, pushed under each other to such an extent that the shaped blanks are overlapped or stepped under and back of each other in the correct manner for the application of the closure flap gumming to the exposed edges. The stepped blank layer thus formed between the belt couples 35, 36 receives the gum application at the exposed edges of the closure flaps by a gumming device 46 according to the well-known so-called coating or spreading process.

The stepped blank layer emerges from the belt couples 35, 36 at the guide rollers 39 and 43 and passes in the first place to the belts 48 guided around the drum 47, and is engaged by adjustable counter-rollers 50 arranged in the same manner as the above described counter-rollers 30 of the suction roll 29. The counter-rollers 50 are so adjusted that each shaped blank in the stepped blank layer is engaged by them at the moment when it is released by the belt pairs 35, 36. This is necessary since the belt pairs 48, 49 now engaging the shaped blank between the drum 47 and a guide roller 51 are driven slightly faster than the belt pairs 35, 36, so that the stepping distance within the stepped blank layer is slightly increased in order to prevent the blanks from sticking together at the edges of their gummed closure flaps while they are between the belt pairs 48, 49. From the drum 47 and the guide roller 51 the strands of the belt pairs 48, 49 running directly above each other are guided by rollers 53 (Fig. 2) supported on a frame 52 which is only partly shown on the drawings. The inner belts 48 are driven by the drum 54 (Fig. 3) from which on their path, occupied by the stepped blank layer, they are guided over rollers 56 freely rotating on an arched frame 55, being led downward by the last of these rollers. By way of guide rollers 57 (Fig. 3) 57' (Fig. 2) and 58 (Fig. 1) the belts 48 move back to the drum 47 (Fig. 1). The outer belts 49 are driven by the drum 59 (Fig. 3) and are guided back by the guide rollers 60 (Fig. 3), 61 and 62 (Fig. 1), to the guide roller 51 (Fig. 1), the roll 62 serving as a tensioning roller.

Beneath the joint path of the belt pairs 48, 49 running against the rollers 53 supported on the frame 52, a channel 63 (shown only in part in Fig. 2) is provided and has in its upper wall, turned towards the belt couples, air openings 64. To this channel 63 hot air from any desired source is fed under pressure and this air emerging from its openings 64 and flowing against the stepped blank layer effects at the same time the drying both of the closure flap gumming and of the imprint applied to one or both sides of the shaped blanks.

While the inner belts 48 move over the entire route of the stepped blank layer from the drum 47 (Fig. 1) by the roller frame 52, 53 (Fig. 2), the drum 54 (Fig. 3) as far as the last guide roller 56 and from there back again to the drum 47, their counter-belt pairs are sub-divided in order to avoid distortions inside of the stepped blank layer. Over the largest curvature of the route of the stepped blank layer at the drum 54 (Fig. 3) belts 65 cooperate with the belts 48. These belts 65 are guided by guide rollers 66 and 67 over the belts 48 around a part of the circumference of the drum 54 and pass over the guide rollers 68, 69 and 70, the roller 69 serving as a tensioning roller. On the further route over the rollers 56 of the frame 55 there are provided for the belt pairs 48 counter-belts 71 which are guided by the drum 72 to the guide roller 73 over the belts 48 running on the rollers 56 and tensioned by a roller 74.

The drive of the counter-belts 49, 65 and 71 cooperating with the belts 48 is effected by a chain drive (not shown in the drawings) from the shaft of the large belt drum 54 to the shafts of the drum 59, the guide rollers 70 and the drum 72.

At the roller 73 guiding the belt pairs 71, the stepped blanks emerge from the belt pairs leading them through their drying route or zone. They are in the first place, while retaining their stepped formation, conveyed by the belts 48 and counter-rollers 75 running freely thereon and are fed to an intermediate belt guided over rollers 76 and 77 and a table 78 extending between both. This intermediate belt, by cooperating in the well-known manner with counter-rollers 80 running freely upon it, increases the stepping distance of the shaped blanks within the blank stack as a result of its correspondingly faster drive. By proper adjustment of the distance between the rollers 75 and 80 possible displacements of individual shaped blanks, that is to say, irregularities in the previously existing stepping distance can be corrected. As the stepping distance is increased in this manner, each blank can be positively engaged singly by a roller pair 81, 82 and drawn off completely from the stepped blank stack. This roller pair 81, 82, is the first element of the folding and pasting machine proper and accordingly rotates at the corresponding higher speed. The blank is fed by the rollers 81, 82 to straightening fingers 83 and 84. The straightened blank then passes into the part of the machine beginning with a roller pair 85, 86 (Fig. 2) in which all the operations for the folding and pasting of the articles are successively performed in the well-known manner. This part of the machine is not of importance for the present invention and a detailed description may therefore be omitted.

Figure 3:
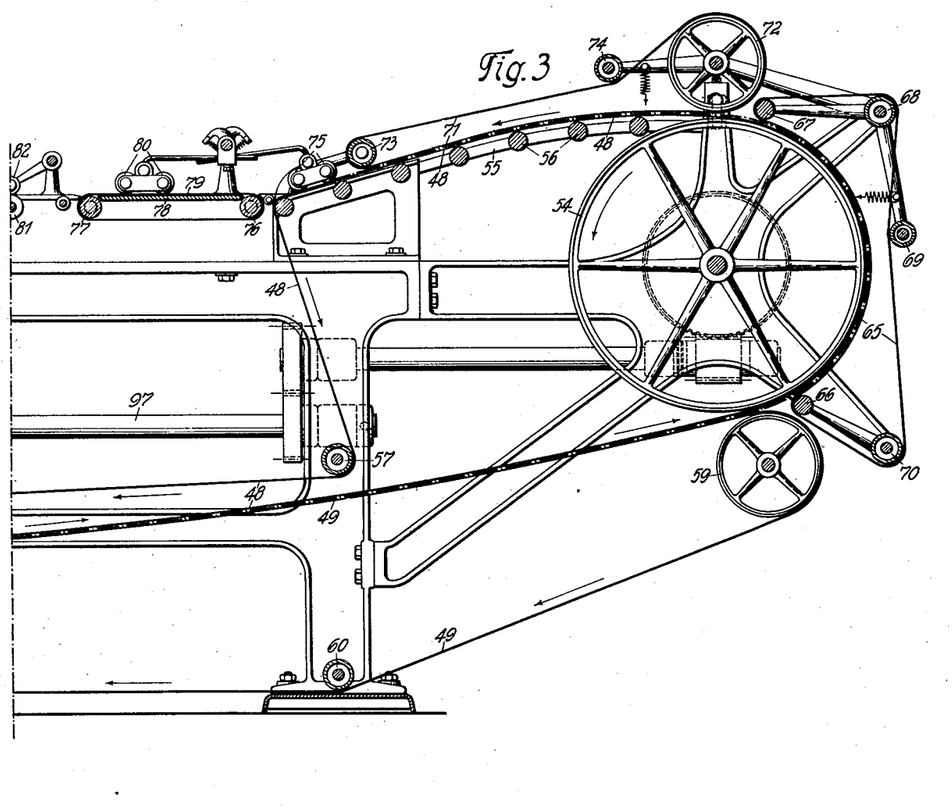

When each article emerges from the roller pair 87, 88, it is complete. It then passes by the dropplate 89 between distributing discs 90 and their counter-rollers 91 and is then, in the well-known manner, conveyed by conveying cams 92 of distributing discs 90 and guides 93, towards the back of two collecting discs 94 which rotate against each other and which, acting as screw conveyors, convey it to their front side and arrange it here on the stack 95.

Figures 5, 6:
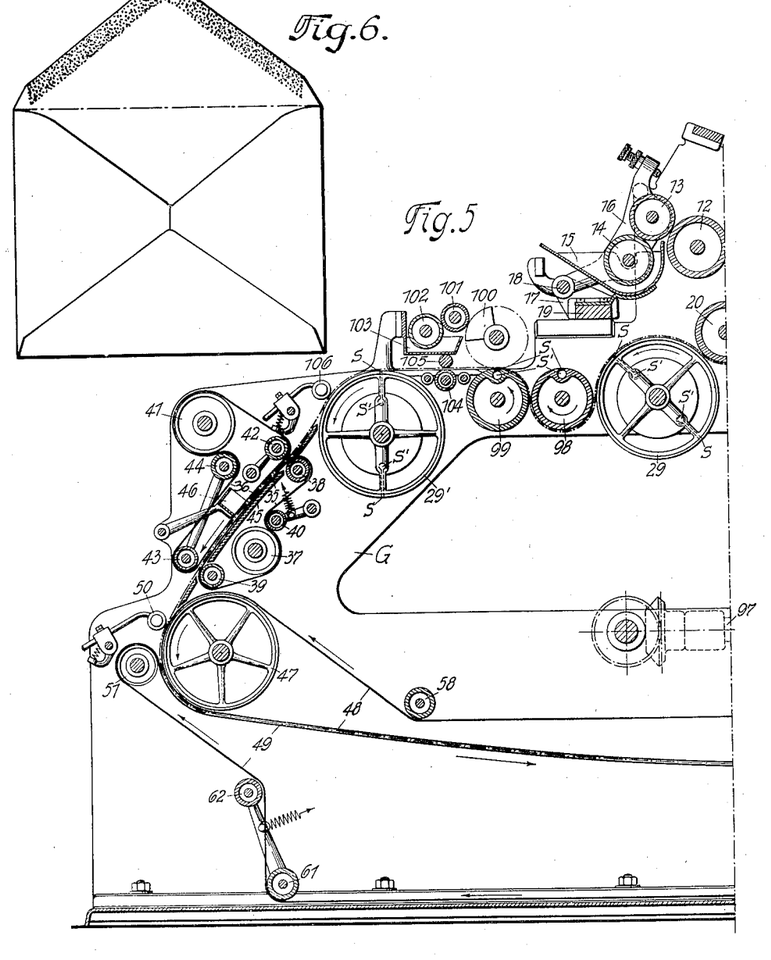
Fig. 5 is a similar view showing another modification.
Fig. 6 shows an envelope with closure flap gumming applied according to the spreading or coating process.

The apparatus above-described serves for the manufacture of articles in which the application of the closure flap gumming to the stepped blank layer is effected by the gumming device 46 (Fig. 1) in the belt pairs 35, 36 according to the coating or spreading process. The stepping of the shaped blanks can therefore be effected after they have passed through the printing mechanisms 11–18 and 20–27, that is to say, simultaneously to their passing to the said belt pairs 35, 36, by the suction roller 29. Such envelope gummed according to the coating or spreading process, is shown in Fig. 6. In this case, as a result of the stepping of the shaped blanks, the inner edge of the gumming always runs parallel to the outer closure flap edge, while the short lateral edges of the gumming lie parallel to the folds of the side flaps as shown.

Figures 4, 7:
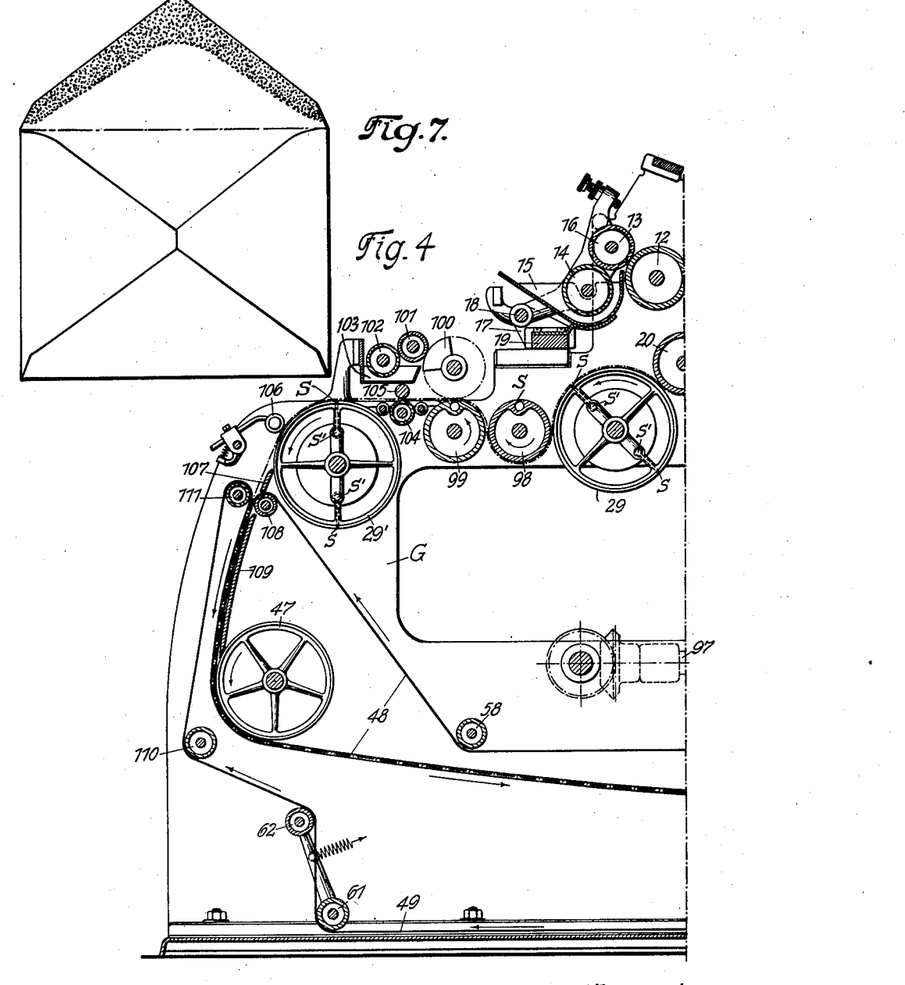
Fig. 4 corresponds to the left-hand portion of Fig. 1 and shows a modified form of gumming means.
Fig. 7 shows an envelope with shaped gumming on the closure flap.

If the articles are to receive a so-called shaped or contoured gumming according or similar to that shown in Fig. 7, where the inner edge of the gumming runs in a curved line which can be selected at will, the spreading process cannot be employed and the gum must be applied to each individual shaped blank by means of a type or stamp corresponding to the desired contour of the gum coating. In this case, too, the essential characteristics of the process according to the invention continues unchanged, since in this connection also the shaped blanks are first provided with the imprint and the shaped or special gumming and are then fed to a drying track or zone in stepped formation for the purpose of joint drying of the imprint and the gumming. The time of the transfer of the shaped blanks into the stepped formation must be changed, however, since the stepping of the shaped blanks takes place only after the special or shaped gumming has been applied to the closure flaps in this case immediately after the printing.

If the articles, in addition to the imprint, are to receive exclusively special or shaped gumming, the apparatus according to the invention is modified only to the extent shown at Fig. 4.

In this case the suction roller 29 delivers the printed blank, which it has taken over from the last printing cylinder 20, to a conveyor roll 98 likewise engaging the blank by suction according to the example shown on the drawings, and which conveyor roll 98 is provided with suction openings s for this purpose. The shaped blank is passed by the roll 98 to an additional roller 99, also assumed to be a suction roller. The latter forms the counter-roller of a rotating gum-applying type 100, which receives the gum from an application roller 101 through the medium of a dipper roll 102 from a container 103 in order to transmit the gum to the shaped blank running between the type 100 and its counter-roller 99. The shaped blank then passes between the conveyor roll pair 104, 105 and thence to the suction roller 29' which has the same diameter and arrangement as the suction roller 29 and accordingly also provides for the conveyance of two successive blanks to one revolution, having suction openings s at two diametrically opposed points of its circumference. This roller 29' engages or grasps the shaped blank and in the first place conveys it under counter-rollers 106 cooperating with it and arranged in the same manner and adjustable like the counter-rollers 30 of the suction roller 29 in Fig. 1. Emerging from the suction roller 29' and its counter-rollers 106, the blank now travels over a short guide plate 107 directly between the slowly running belt couples 48, 49 which, as in Figs. 1 to 3, form the drying route or zone for the joint drying of the imprint and the closure flap gumming of the blanks. The drive of the belts 48, 49 now takes place in this case at such a speed that the shaped blanks fed by the fast running suction roller 29' are stepped under and back of each other with such a stepping distance that the still moist special or shaped gummings of the blanks are entirely uncovered.

As shown at Fig. 4, in the apparatus adapted exclusively for special gumming the belts 49 in their return from the guide roller 58 are not reversed directly around the drum 47 but pass over the guide rollers 108 lying close to the suction roller 29' and over an arched table 109. Likewise the return run of the belt pairs 49 is led from the tensioning roller 62 over a guide roller 110 to a guide roller 111 which lies opposite the guide roller 108 of the belts 48.

In this arrangement for guiding the belt pairs 48, 49, the stepping of the shaped blanks is effected by the suction roller 29' when they pass into the said belt pairs. The stepped blank stack then travels through the belt pairs 48, 49 and thereby through the drying route or zone in exactly the same manner as was described above with reference to Figs. 1-3. The remaining part of the apparatus as a whole which serves for folding and pasting the articles also remains the same as in Figs. 1-3.

In Fig. 5 there is shown a third form of apparatus which is adapted to provide shaped blanks selectively either with spread gumming according to Fig. 6 or with special or shaped gumming according or similar to Fig. 7. There are added here as a continuation with reference to the route of the shaped blank, of the printing mechanisms 11-19 and 20-28 and of the suction roller 29 taking over the shaped blank from the last-mentioned, the arrangements 98-103 for producing the special gumming as well as the conveyor roll pair 104, 105 and the suction roller 29' with its counter-rollers 106 according to Fig. 4, while on the further route of the shaped blank there are provided behind the suction roller 29', in accordance with Fig. 1, the conveyor belt pairs 35, 36 with their guide rolls 37-40 or 41-44 as well as the arched table 45 and the gum spreading device 46. The belt drum 47 for guiding the belts 48 with the counter-rollers 50 and the guide roller 51 of the belts 49 are also arranged the same as in the form of embodiment according to Fig. 1.

When this form of apparatus is employed for providing blanks with printing and with shaped or special gumming, the printed blanks pass from the suction roller 29 in the manner described above with reference to Fig. 4 by the suction roller 98 to the special gumming device 99-103, which is caused to act in this case. After the special gumming has been applied, the blanks reach the suction roller 29' through the conveyor roll pair 104, 105. This suction roller 29' jointly with its counter-roller 106 conveys the blanks between the slowly running belt pairs 35, 36 whose speed of operation (by the use of a change gear not shown or by means of interchangeable gears) is so arranged that between them the blanks are stepped with such a distance that the complete exposure of the still moist special gummings is insured. The gum spreading device 46 is rendered ineffective so that the belt pairs 35, 36 serve merely as conveyor belts which transmit the stepped blank stack to the belt pairs 48, 49 driven at the same speed. These belt pairs 48, 49 convey the blanks in the manner described through the drying route or zone and to the folding and pasting apparatus.

In order to provide the articles with gum spreading, by the use of the apparatus according to Fig. 5, the special gumming device 99-103 is put out of operation and the spreading device 46 is rendered effective. The rollers 98, 99 and the gumming type 100 then serve the same as the rollers 104, 105, merely as conveyor rolls which pass the shaped blanks on to the suction roller 29' by which they are stepped between the belt pairs 35, 36 in which they receive the spread gumming by means of the device 46. From the conveyor belt pairs 35, 36 which in this case are again driven at the speed required for the stepping with a view to the gum spreading, the shaped blanks, as in the device of Fig. 1, reach the conveyor belt pairs 48, 49 which move slightly faster, and the blanks are thus conveyed to the drying route or zone and thence to the folding and pasting machine. The gumming type 100 not required in the production of spread gumming can, if desired, be replaced by an interchangeable ordinary roller.

Figure 2:
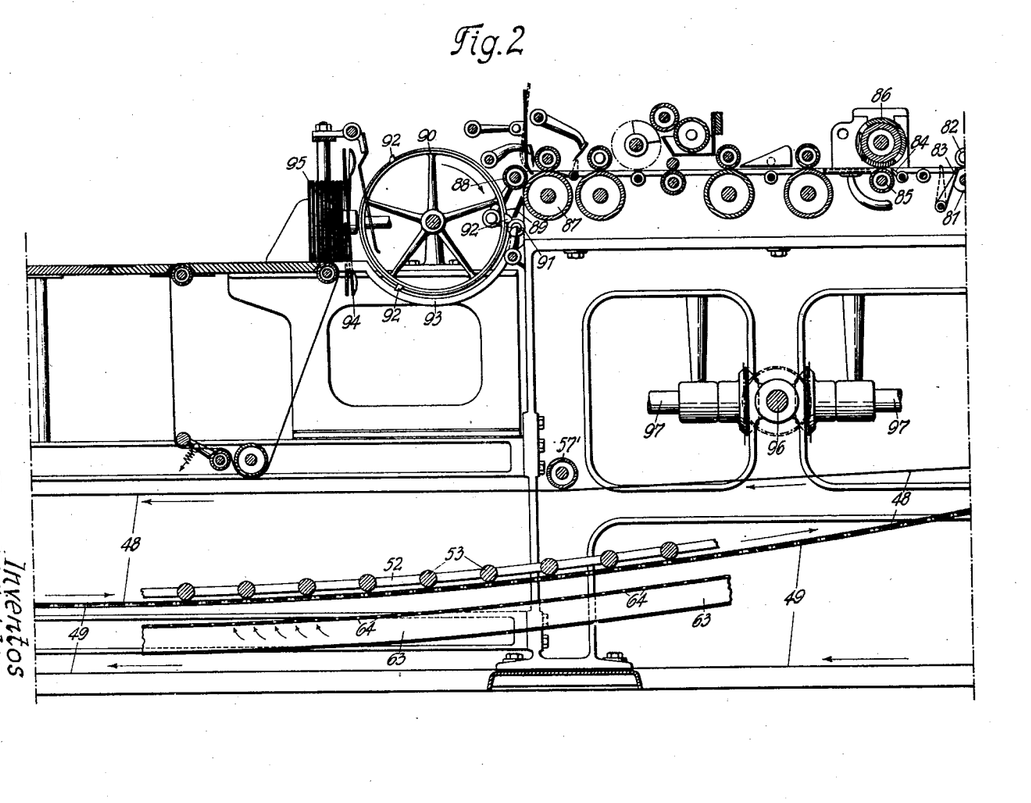

For the present invention the sequence of the steps in the process is of particular importance. A detailed description of the drive of all the parts of the entire apparatus therefore is omitted and the driving means are not reproduced in detail in the drawings. The main drive of the apparatus takes place through the shaft 96 (Fig. 2). The longitudinal shafts 97 driven by this shaft and shown broken off, lead to the main parts of the apparatus.

Although the drawings and the above specification disclose the best mode in which we have contemplated embodying our invention, we desire to be in no way limited to the details of such disclosure, for in the further practical application of our invention many changes in the process and in the apparatus may be made as circumstances require or experience suggests without departing from the spirit of the invention within the scope of the appended claims, and the process and apparatus may be employed either with or without means for use in pasting and folding the blanks to complete the formation of the envelopes, bags, and other articles.

What we claim is:

1. A process for the treatment of shaped blanks for the manufacture of envelopes, bags, and similar articles, which comprises feeding the blanks continuously and successively to a printing device, printing upon the blanks, applying gum to the closure flaps of the blanks, and then conveying the blanks in overlapping, stepped relation while at the same time drying the printing and the gum on the blanks.

2. In the manufacture of envelopes, bags, and similar articles, the method of printing the blanks and applying gum to the closure flaps, which comprises feeding the blanks successively and separately, printing upon the blanks while being so fed, applying gum to the closure flaps while the blanks are being so fed, arranging the blanks in overlapping, stepped relation to each other in a continuous operation, and conveying the stepped blanks through a drying track to simultaneously dry the printing and the gum.

3. In the manufacture of envelopes, bags, and similar articles, the method of printing the blanks and applying gum to the closure flaps, which comprises feeding the blanks successively and separately, printing upon the blanks while being so fed, arranging the blanks in overlapping, stepped relation to each other in a continuous operation, spreading gum upon exposed portions of the closure flaps, conveying the stepped blanks through a drying zone to simultaneously dry the printing and the gum, and separating the dried blanks from each other all in a continuous operation.

4. Apparatus for use in the manufacture of envelopes, bags, and similar articles from shaped blanks, comprising means for feeding the blanks separately and successively, means for impressing printing upon one side of each separated blank, means for receiving the printed blanks and for arranging same in overlapping, stepped relation, means for spreading gum upon the exposed parts of the closure flaps of the overlapping blanks, a drying zone, means for conveying the overlapping blanks to the drying zone to dry the printing and the gummed flaps simultaneously, and means for receiving and separating the blanks beyond the said drying zone.

5. Apparatus for use in the manufacture of envelopes, bags, and similar articles from shaped blanks, comprising means for feeding the blanks successively, means for impressing printing upon one side of each blank, means for impressing printing upon the opposite side of each blank, means for receiving the printed blanks and for arranging same in overlapping, stepped relation, means for spreading gum upon the exposed parts of the closure flaps of the overlapping blanks, a drying zone, and means for conveying the overlapping blanks direct to the drying zone to dry the printing and the gummed flaps simultaneously.

6. Apparatus for use in the manufacture of envelopes, bags, and similar articles from shaped blanks, comprising means for separating the blanks and conveying them successively, printing means for impressing one side of each blank, means for receiving the blanks from said printing means and for applying gum to the closure flap of the blanks, a drying zone for receiving the blanks from said gumming means, means for receiving and conveying the blanks in overlapping, stepped relation to and through the said zone, and means beyond the said zone for receiving and separating the blanks after the drying of the printing and gum, all in one continuous operation.

7. Apparatus for use in the manufacture of envelopes, bags, and similar articles from shaped blanks, comprising means for separating the blanks and conveying the individual blanks successively, printing means for impressing one side of each blank while being conveyed, printing means for impressing the opposite side of each blank while being conveyed, means for applying gum to the closure flap of the blanks after said printing, a drying zone for the blanks, means for receiving the blanks from said gum applying means and for directly conveying the blanks in overlapping, stepped relation through the said drying zone, means beyond the zone for receiving and separating the blanks after the simultaneously drying of the printing and gum, all in one continuous operation, and means for completing the formation of the envelope or other article.

8. Apparatus for use in the manufacture of envelopes, bags, and similar articles from shaped blanks, comprising means for printing the blanks, means for typing shaped gum upon the blanks, means for spreading gum upon the blanks, means for rendering one of the said gum-applying means inoperative, and means for receiving and conveying the blanks in overlapping relation and for simultaneously drying the printing and the gum.

9. Apparatus for use in the manufacture of envelopes, bags, and similar articles from shaped blanks, comprising means for printing both sides of the blanks, means for stamping a shaped gum coating upon the closure flap of each blank, means for spreading gum upon the closure flaps of the blanks, means for rendering one of the said gum-applying means inoperative, means for arranging the blanks in overlapping relation, and means for simultaneously drying the printing and the gum.

10. Apparatus for use in the manufacture of envelopes, bags, and similar articles from shaped blanks, comprising rotary suction means for separating the blanks and feeding same successively, means for printing upon the separated blanks, means for applying gum to the closure flaps of the blanks, means for receiving the blanks and arranging same in overlapping stepped relation, and means for conveying the stepped blanks and for drying the printing and the gum.

11. Apparatus for use in the manufacture of envelopes, bags, and similar articles from shaped blanks, comprising rotary suction means for separating the blanks and feeding same successively, means for printing upon the separated blanks, means for receiving the blanks and arranging same in overlapping, stepped relation, means for spreading gum upon the exposed edges of the closure flaps of the blanks, means for conveying the stepped blanks and for drying the printing and the gum, and means for receiving and separating the dried blanks.

12. Apparatus for use in the manufacture of envelopes, bags, and similar articles from shaped blanks, comprising means for separately and successively feeding the blanks, means for printing upon the separated blanks, means for applying shaped gum coatings to the closure flaps of the blanks, means including suction mechanism for arranging the blanks in overlapping stepped relation, a drying zone for the blanks, means for conveying the stepped blanks to said zone, and means beyond the zone for receiving and separating the blanks.

13. Apparatus for use in the manufacture of envelopes, bags, and similar articles from shaped blanks, comprising means for separately and successively feeding the blanks, means for printing upon the separated blanks, means for applying shaped gum coatings to the closure flaps of the blanks, means including rotary suction mechanism for arranging the blanks in overlapping stepped relation, a hot air drying zone for the blanks, means for conveying the stepped blanks to said zone, means for directing hot air upon the blanks in said zone, and means beyond the zone for receiving and separating the blanks.

14. Apparatus for use in the manufacture of envelopes, bags, and similar articles from shaped blanks, comprising suction means for feeding the blanks separately and successively, means for printing upon the separated blanks, means for typing shaped gum coatings upon the closure flaps of the separated blanks, means for receiving the blanks and arranging same in over-lapping stepped relation, a drying zone for the blanks, means for conveying the stepped blanks to the drying zone, and means beyond said zone for receiving the dried blanks.

15. Apparatus for use in the manufacture of envelopes, bags, and similar articles from shaped blanks, comprising suction means for feeding the blanks separately and successively, means for printing upon the separated moving blanks, means for typing shaped gum coatings upon the closure flap of each separated blank, rotary suction means for receiving the blanks and arranging same in over-lapping stepped relation, a drying zone for the blanks, means for conveying the stepped blanks to the drying zone, means for directing drying air upon the blanks in said zone, and means beyond said zone for receiving the dried blanks.

16. Apparatus for use in the manufacture of envelopes, bags, and similar articles from shaped blanks, comprising means for feeding and printing upon the blanks, means for applying shaped gum coatings to the moving blanks, means for arranging the blanks in overlapping stepped relation, means for spreading gum upon the overlapping blanks, means for rendering one of the said gum applying means inoperative, means for receiving and conveying the overlapping blanks, means for applying heat to the stepped blanks to dry the gum and the printing simultaneously, and means for receiving the dried blanks.

17. Apparatus for use in the manufacture of envelopes, bags, and similar articles from shaped blanks, comprising means for feeding and printing upon the blanks, means for stamping shaped gum coatings upon the closure flap of the blanks, means for arranging the blanks in overlapping stepped relation, means for spreading gum upon the closure flaps of the overlapping blanks, means for rendering one of said gum applying means inoperative, variable speed means for conveying the blanks, and means for applying heat to the overlapping blanks to dry the gum and the printing simultaneously.

ALFRED WINKLER.
MAX DÜNNEBIER.